(12) United States Patent
Ponamar

(10) Patent No.: US 7,819,545 B2
(45) Date of Patent: Oct. 26, 2010

(54) OUTDOOR SOLAR DECORATIVE LIGHTS

(76) Inventor: Gwendolyn R. Ponamar, 94 Liberty Ave., Weirton, WV (US) 26060

( * ) Notice: Subject to any disclaimer, the term of this patent is extended or adjusted under 35 U.S.C. 154(b) by 227 days.

(21) Appl. No.: 12/218,205

(22) Filed: Jul. 14, 2008

(65) Prior Publication Data

US 2010/0008077 A1    Jan. 14, 2010

(51) Int. Cl.
    *F21L 4/00*    (2006.01)
(52) U.S. Cl. .................. 362/183; 362/276; 362/394; 362/249.12
(58) Field of Classification Search .............. 362/183, 362/184, 151, 152, 276, 411, 394, 295, 249.02, 362/249.05, 249.06, 249.12, 249.14, 249.16
See application file for complete search history.

(56) References Cited

U.S. PATENT DOCUMENTS

| 5,211,470 | A |   | 5/1993  | Frost |
| 5,262,756 | A |   | 11/1993 | Chien |
| 5,410,458 | A |   | 4/1995  | Bell |
| 5,957,564 | A | * | 9/1999  | Bruce et al. ............... 362/84 |
| 6,339,188 | B1 | * | 1/2002  | Voelkner .................. 136/251 |
| 6,764,202 | B1 |   | 7/2004  | Herring |
| 6,837,255 | B2 |   | 1/2005  | Bunch |
| 7,273,294 | B2 | * | 9/2007  | Kao ........................ 362/192 |
| 2007/0171634 | A1 | * | 7/2007  | Kao ........................ 362/192 |
| 2008/0211412 | A1 | * | 9/2008  | Chen ....................... 315/152 |

* cited by examiner

*Primary Examiner*—Bao Q Truong
(74) *Attorney, Agent, or Firm*—Theresa M. Seal

(57) ABSTRACT

An outdoor solar powered decorative lighting system includes a light string having a plurality of light bulbs evenly spaced along the length of the string and being electrically connected to a roof mounted solar collector having one or more solar panels or cells for collecting sunlight—radiant energy—from the sun and which is then conveyed to a rechargeable battery enclosed within the solar collector for discharge to provide the power to illuminate the light bulbs and thus create the decorative lighting effect with the solar collector including a switch to automatically turn the light bulbs on at dusk and to switch the light bulbs off at the following sunrise.

3 Claims, 4 Drawing Sheets

OUTDOOR SOLAR DECORATIVE LIGHTS

FIELD OF THE INVENTION

The present invention pertains to decorative outdoor lights, and more particularly pertains to decorative outdoor lights that are solar powered and not powered from regular residential electrical current or electricity.

BACKGROUND OF THE INVENTION

Decorating for religious holidays and observances, national holidays and commemorations, and personal accomplishments, milestones, and achievements is a time-honored activity that spans cultures, time periods, and nations. The decorations can be store bought or handmade, and such decorations can be hung, strung, affixed, mounted or otherwise arranged indoors and outdoors on all manner of residential dwellings, public buildings, office cubicles, courtyards, city squares and parks. One of the most common types of decorations is lights or strings of lights, and although they are most commonly associated with the Christian holiday of Christmas, they are now used as decorations for a wide range of occasions and observances ranging from Halloween, Easter, and The Fourth of July to summer picnics and parties, graduation, commencement, and birthday observances and celebrations. The colors of the lights have now been expanded to correspond to the particular holiday, observance, or occasion, and lights, either as stand-alone items or arranged on strings, are specifically marketed for the particular holiday, occasion, celebration or observance. However, the overwhelming majority of decorative colored lights are of the plug-in type that must be plugged into an electrical outlet or receptacle (indoor or outdoor) and powered from standard electrical current—primarily house or residential current. This presents numerous problems that include the very real danger of electrical shorts and shocks occurring as the electrical string or cord the lights are mounted on extends along the ground and is exposed to outdoor conditions that can include rain, sleet, frost, and snow. In addition, electrical extension cords are often used with the decorative light strings, and along with the abovementioned dangers of electrical shorts and shocks, lengths of extension cord strung along the ground and about a yard to electrical outlets present the additional hazard of being run over by automotive vehicles and lawn mowers and causing people to trip and fall over them as they aren't visible at dusk or night and may be covered by leaves, grass, and snow. Thus, the prior art discloses a variety of light systems and arrangements some of which are solar powered to obviate the above problems.

For example, the Frost et al. patent (U.S. Pat. No. 5,211,470) discloses a self-contained solar powered lamp and which is used to delineate certain predetermined boundaries without effectively illuminating the area.

The Chien patent (U.S. Pat. No. 5,262,756) discloses a solar powered warning light for powering warning lights adjacent or alongside roads and highways to warn drivers of road hazards and environmental hazards and which includes a recharging network for a single nickel-cadmium battery.

The Bell patent (U.S. Pat. No. 5,410,458) discloses an illuminated landscape edging with the landscape edging including edging sections and each edging section having a tubular member for enclosing therein a length of a string of Christmas lights and a planar member attached to the tubular member for insertion into the ground to support the edging section.

The Herring et al. patent (U.S. Pat. No. 6,764,202 B1) discloses an illuminator for illuminating tombstones and which includes an alignment adjuster and a lens and which is solar powered.

The Bunch et al. patent (U.S. Pat. No. 6,837,255 B2) discloses an illuminated umbrella assembly having self-contained and replaceable lighting and wherein the lights are protected by various components of the umbrella.

These and other objects, features, and advantages will become apparent to those skilled in the art upon a perusal of the following detailed description when read in conjunction with the accompanying drawing figures and appended claims.

SUMMARY OF THE INVENTION

The present invention comprehends an outdoor solar powered decorative lighting system or arrangement that utilizes the natural energy of the sun to power the electrical lights that comprise the lighting system or arrangement. By utilizing solar power a variety problems using regular residential electricity or electrical current are obviated ranging from the elimination of extension cords and power cords to the elimination of fire hazards to the ease of installation and storage.

Thus, the outdoor solar powered decorative lighting system includes at least one flexible light string ranging anywhere from five to 20 feet in length. Enclosed within the light string is an electrical wire commensurate in length with the light string. Spaced along the entire length of the light string is a plurality of receptacles or sockets and removably insertable into each socket is a light bulb that can be clear or colored. The light string is electrically interconnected to a solar collector that includes one or more solar cells or panels for collecting the radiant energy from the sun for conveyance and storage in a rechargeable battery enclosed within the solar collector. The solar energy stored within the battery is discharged during dusk and nighttime hours and is regulated in its discharge by a switch so that the system operates only at dusk and nighttime and is switched off during daylight hours. The solar collector would be mounted on the roof of the dwelling at an appropriate orientation and the light string would, for example, be mounted along the overhang of the roof, the railing of the porch, along and about a deck or about an adjacent tree. In addition, the light string could be disposed alongside a walkway leading to the dwelling for lighting the walkway at night. Thus, the outdoor solar powered decorative lighting system of the present invention provides convenience, reliability, and ease of installation and use for the homeowner.

It is an objective of the present invention to provide outdoor decorative solar powered lights that will run of solar power instead of electricity thereby saving the homeowner money by reducing the electrical bill for the time period the outdoor decorative lights are in use.

It is another objective of the present invention to provide outdoor decorative solar powered lights that are easier to hang on roofs, awnings, porch railings, overhangs, outdoor trees, etc., because they will not need to use long and cumbersome electrical extension cords.

It is still yet another objective of the present invention to provide outdoor decorative solar powered lights that are easier to hang because they do not need long and cumbersome electrical extension cords and therefore they save the homeowner effort and time in the decorating and hanging process.

It is still yet a further objective of the present invention to provide outdoor decorative solar powered lights that will come on automatically at dusk and turn off automatically at dawn.

Still another objective of the present invention is to provide outdoor decorative solar powered lights that produce less cluster and allow for more efficient packaging and storage until the next occasion of use.

Still yet another objective of the present invention is to provide outdoor decorative solar powered lights that greatly reduce the concern and worry of electrical fires occurring through the ignition of power cords or strips and the ignition of electrical lights.

Still yet a further objective of the present invention is to provide outdoor decorative solar powered lights that come in multiple colors.

Yet another objective of the present invention is to provide outdoor decorative solar powered lights that can be used for a variety of occasions and celebrations such as Thanksgiving, Easter, Hanukkah, Rosh Hashanah, Christmas, Halloween, the Fourth of July, Memorial Day, Ramadan, etc., as well as graduations, retirements, weddings, births.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Illustrated in FIGS. 1-7 is an outdoor decorative solar powered lighting system or arrangement 10 for providing decorative lighting for a dwelling or structure to celebrate or commemorate all types of holidays, observances, and occasions ranging from national holidays, religious holidays and festivals, personal milestones and accomplishments; these can include events and occasions ranging from Christmas, Easter, Thanksgiving, The Fourth Of July, Halloween and Hanukkah to graduations, retirements, weddings, and anniversaries.

Figure 4:
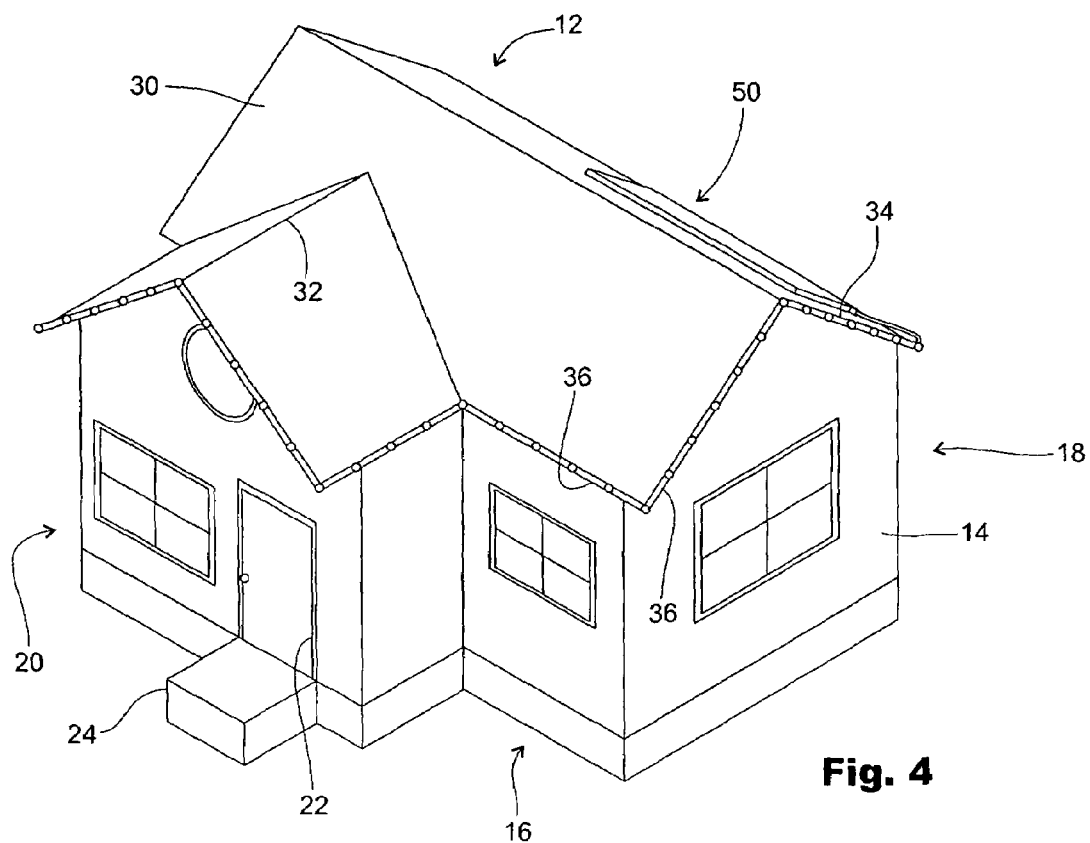
FIG. 4 is a perspective view of the outdoor decorative solar powered lights of the present invention illustrating the arrangement and mounting of the solar panel and solar powered lights to the main roof and porch roof of a residential dwelling.
Figure 5:
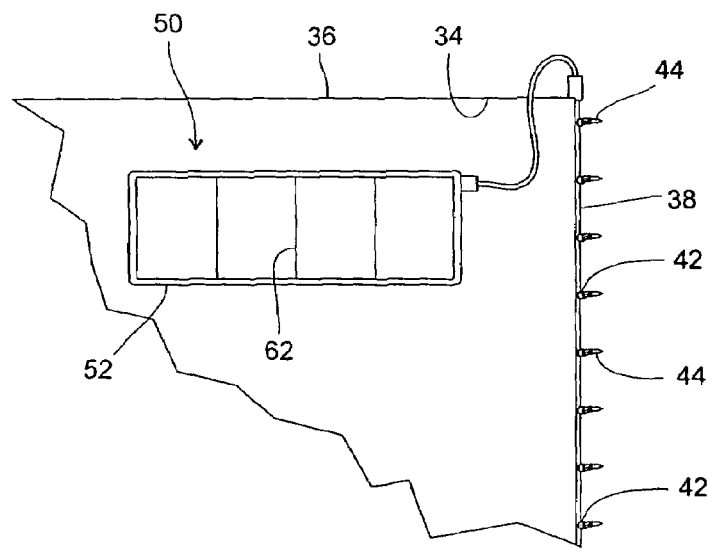
FIG. 5 is a top plan view of the outdoor decorative solar powered lights of the present invention illustrating the mounting of the solar panel on the roof of the dwelling and the arrangement and mounting of a length of the solar powered lights on the overhang of the roof of the dwelling.
Figure 6:
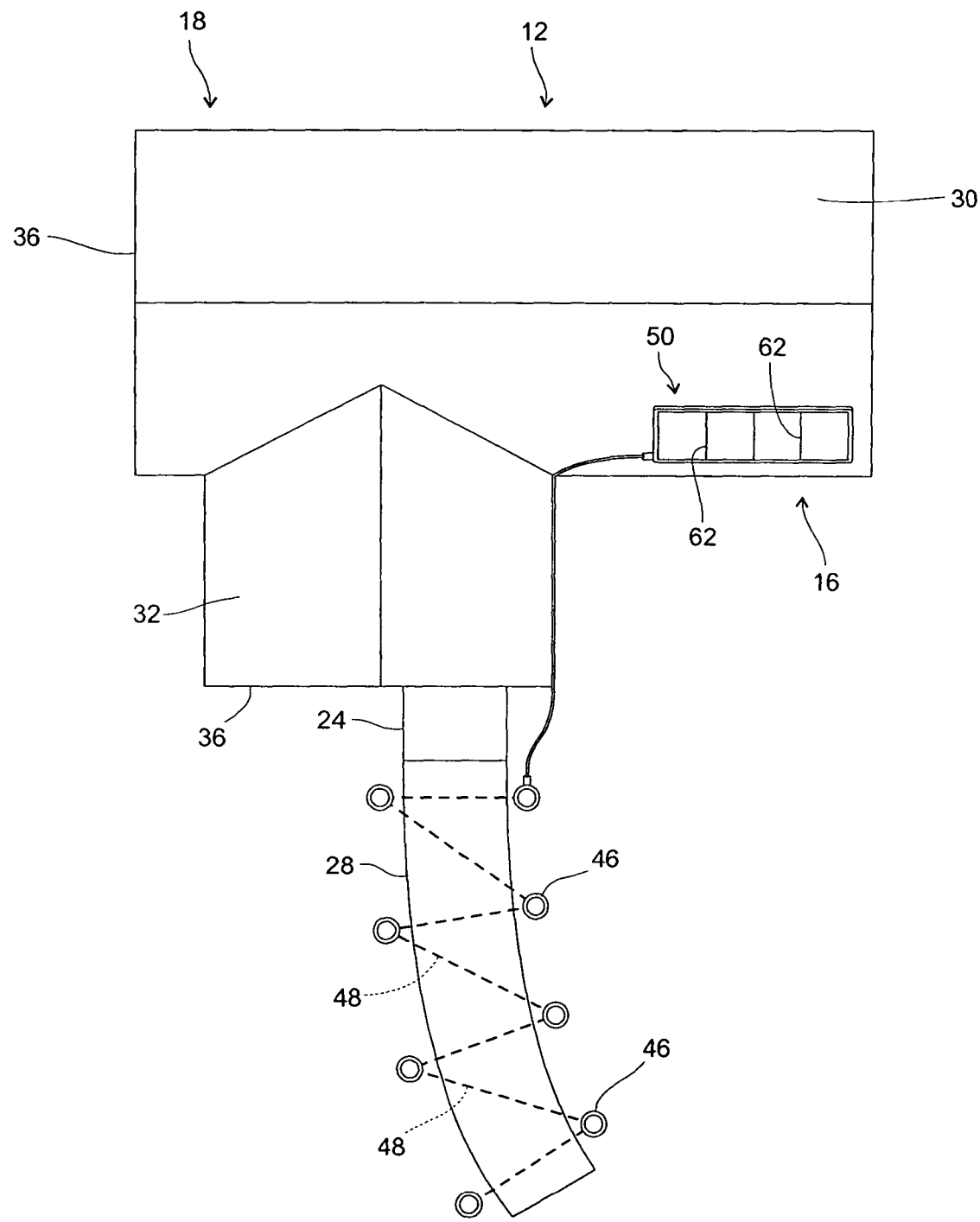
FIG. 6 is a top plan view of the outdoor decorative solar powered lights of the present invention illustrating the mounting of the solar panel on the roof of the dwelling interconnected to solar powered lights that line a walkway on both sides that leads to the dwelling.

Thus, shown in FIGS. 4-6 is a representative dwelling 12 such as a residential house having sidewalls 14, a front 16 and back 18, a porch 20, a front door 22, and a landing 24 leading to the front door 22. FIG. 6 shows a walkway 28 connecting to the landing 24 and leading to the front door 22. The dwelling 12 includes a pitched or sloping main roof 30, and the porch 20 also includes a porch roof 32 extending toward the front 16 of the dwelling 12 at an orientation that is perpendicular to the longitudinal extension of the dwelling 12. Both the main roof 30 and the porch roof 32 include a continuous overhang 34 and edge 36 and along and to which components of the outdoor decorative lighting system 10 are mounted or attached to.

Illustrated in FIGS. 1-7 are the elements or components that comprise of the outdoor decorative solar powered lighting system 10. The outdoor lighting system 10 includes an elongated, flexible light string 38 that can come in various lengths ranging from five feet to 20 feet. Encased within the light string 38 and commensurate in length therewith is an electrical wire 40. Evenly spaced therealong are a plurality of receptacles or sockets 42 with the sockets 42 being in electrical interconnection with the electrical wire 40 via electrical contacts one of which is located at the bottom or inside of each socket 42.

As shown in FIGS. 1 and 4-6, disposed within each socket 42 is a light bulb 44 that may be colored to correspond to the particular season, occasion, holiday or observance (red or green for Christmas, pastel for Easter, red, white, and blue for the Fourth of July, orange and black for Halloween, etc.) The light bulbs 44 are insertably removable into and out from the respective sockets 42 so that they can be individually replaced as needed when they become broken or damaged. There are numerous ways to mount the light string 38 and light bulbs 44 on the dwelling to achieve the maximum desired effect. Illustrated in FIGS. 4 and 5 is one representative mounting manner that includes attaching the light string 38 to the edge 36 of the overhang 34 of the main roof 30 and the porch roof 32 of the dwelling 12 by any conventional manner using nails, fasteners, clamps, or brackets. FIG. 6 illustrates a second representative manner of mounting that includes larger sized or dimensioned light bulbs 46 mounted on upright stakes that are driven into the ground 48 adjacent and on opposite sides the walkway 28 leading to the landing 24 and the front door 22. Portions of the light string 48 are buried under the walkway 28 to avoid anyone tripping and falling over an aboveground length or portion of the light string 48.

Figure 1:
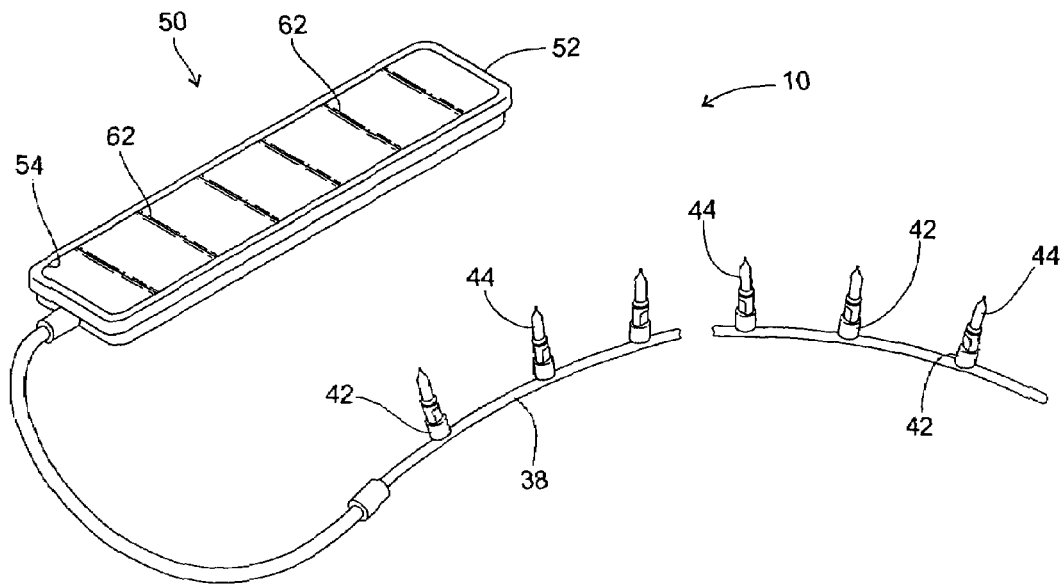
FIG. 1 is a perspective view of the outdoor decorative solar powered lights of the present invention illustrating the major components of the system.
Figure 2:
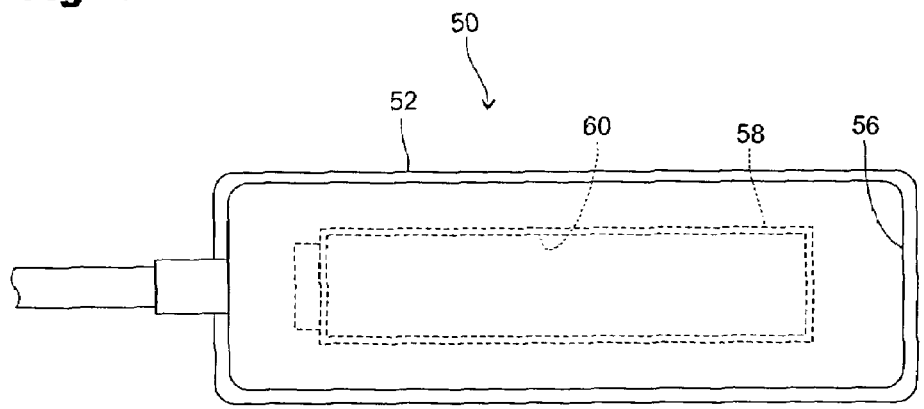
FIG. 2 is a bottom plan view of the outdoor decorative solar powered lights of the present invention illustrating the underside of the housing for the rechargeable battery.
Figure 3:
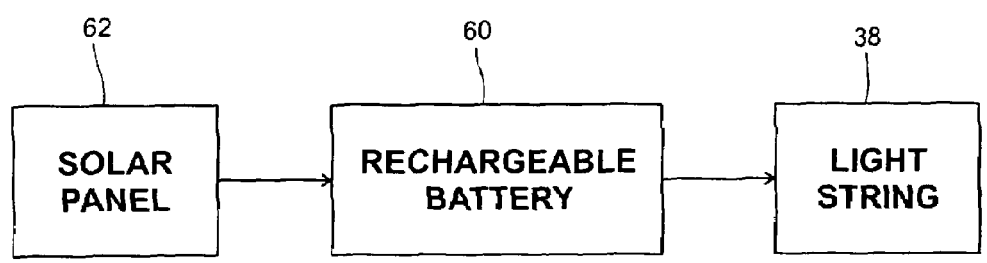
FIG. 3 is a schematic view of the outdoor decorative solar powered lights of the present invention illustrating the direction of current flow for the system.

Electrically interconnected to the light string 38 and the light bulbs 44 is a solar collector 50. The solar collector 50 can come in various sizes, dimensions, thickness, and can be square-shaped or rectangular-shaped. The solar collector 50 is defined by a housing 52 that includes an upper side 54 and a back or bottom side 56. On the underside 54 of the housing 52 is a removable back panel 58 that provides access to a rechargeable battery 60 should the battery 60 for any reason need replaced, and which is contained within the housing 52. Also, mounted to the housing 52, and adjacent the upper side 54, is a plurality of solar panels or photovoltaic cells 62 for collecting sunlight—radiant energy—and then conveying the collected and absorbed energy to the rechargeable battery 60 contained within the housing 52 of the solar collector 50. The solar panels 62 thus provide the battery 60 with a clean and easily renewable source of energy. The solar collector 50 is mounted on any roof surface such as the slanted main roof 30 of the dwelling 12 shown in FIG. 4 and is preferably mounted on the south facing portion of the roof 30 for optimal capture and collection of the maximum amount of radiant energy striking and falling on it from the sun. A portion of the light string 38 extends from one end of the light string 38 to the solar collector 50. FIG. 3 illustrates the collection of radiant energy by the solar panel(s) 62, the transference of the energy to the rechargeable battery 60 and the discharge of such stored energy in the form of direct current through the light string 38 for lighting the light bulbs 44 or 46.

Figure 7:
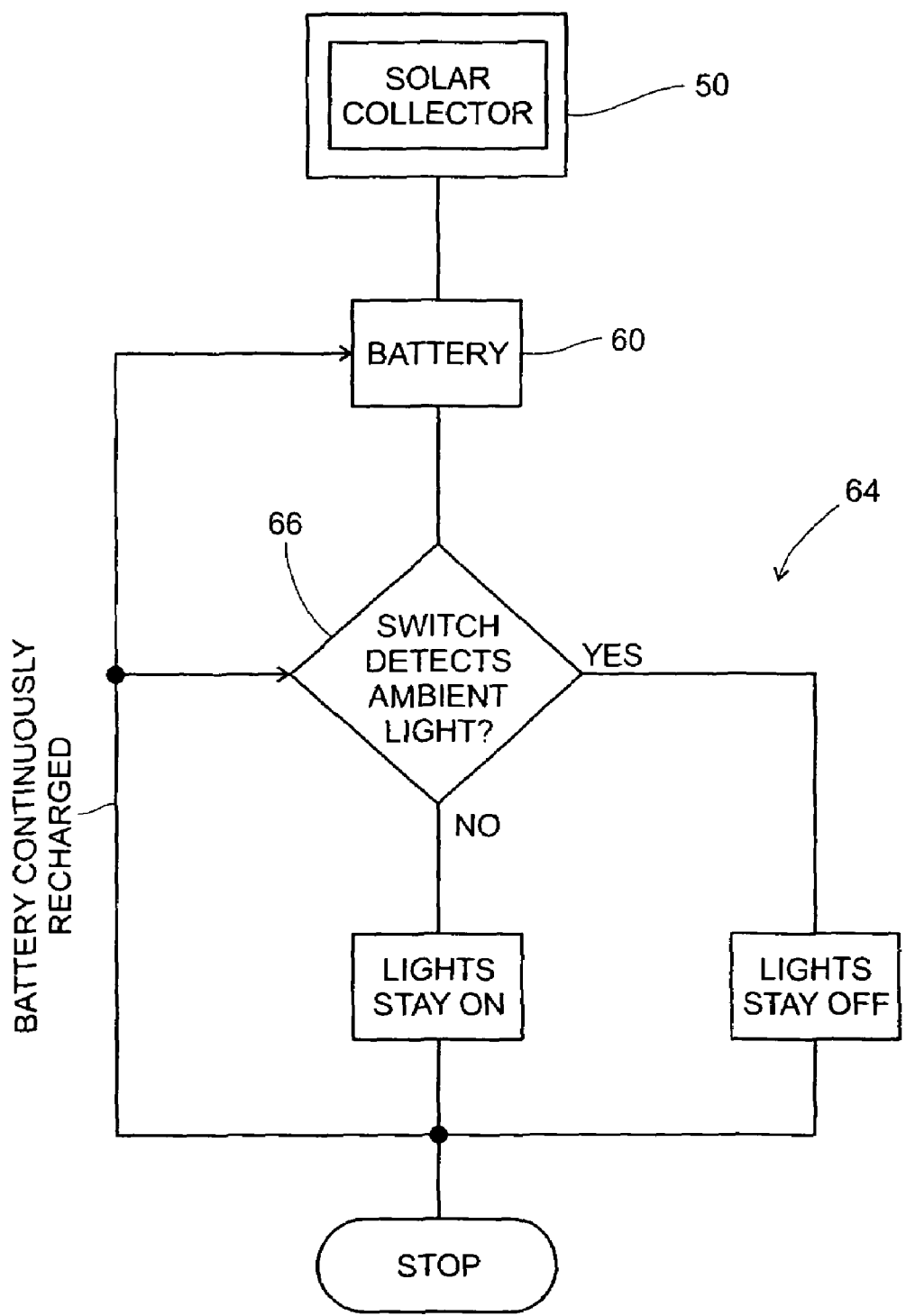
FIG. 7 is a representative flowchart of the steps of the outdoor decorative solar powered lights of the present invention illustrating the basic electrical functions and components of the solar powered light system.

FIG. 7 illustrates a representative flowchart 64 for the operation of the outdoor decorative lighting system 10. The system 10 would be mounted to the main roof 30 of the dwelling 12 with the light string 38 secured along and to the edge 36 of the overhang 34 of the both the main roof 30 and the porch roof 32 with the solar collector 50 mounted to the main roof 30 and preferably to that portion of the roof 30 facing south. An on/off current regulator switch 66 is interconnected to the battery 60 to further regulate current to the light string 44 through the detection or non-detection of ambient light. Thus, the switch 66 is maintained in an open state during periods of daylight (detection of light between sunrise and sunset adjusted seasonally), and the switch 66 is disposed to the closed state by the non-detection of light (immediately upon sunset and extending to the next sunrise) thereby completing the circuit so that current can flow through the electrical wire 40 extending through the light string 38 to the light bulbs 44 thus causing them to light for the decorative lighting effect. The opening and closing of the switch 66 is thus done automatically saving the homeowner the trouble of turning the system 10 on every night and off the next morning.

The foregoing is considered as illustrative only of the principles of the invention; and since numerous modifications, alterations, and variations will readily occur to those skilled in the art, it is not desired to limit the invention to the exact, specific, and precise construction and operation herein shown and described but all suitable, practicable, and conceivable modifications, equivalents, and aberrations may be resorted to while still falling within the scope of the invention and the ambit of the appended claims.

I claim:

1. An outdoor decorative solar powered lighting system, comprising:
    a flexible, elongated light string;
    an electrical wire extending through the light string and commensurate in length therewith;
    a plurality of sockets mounted on the light string and spaced evenly therealong;
    a plurality of light bulbs mounted to the sockets with one light bulb being mounted to each respective socket;
    a solar collector electrically connected to the light string and including a bottom side and an upper side;
    the solar collector including a housing and at least one solar panel supported in the housing for collecting radiant energy from the sun;
    a rechargeable battery contained within the housing and electrically connected to the solar panel for providing energy to the rechargeable battery; and
    a regulator switch electrically interconnected to the battery and the light string for automatically switching the light bulbs on and off whereby the switch is disposed to the open state from sunrise to sunset thereby preventing the light bulbs from lighting and the switch automatically going to the closed state upon sunset thereby closing the circuit and causing the light bulbs to light.

2. The outdoor decorative solar powered lighting system of claim 1 wherein the light bulbs are colored to correspond to the particular event, occasion, observance, and commemoration.

3. The outdoor decorative solar powered lighting system of claim 2 wherein the bottom side of the housing includes a removable back panel for allowing access to the rechargeable battery.

* * * * *